UNITED STATES PATENT OFFICE.

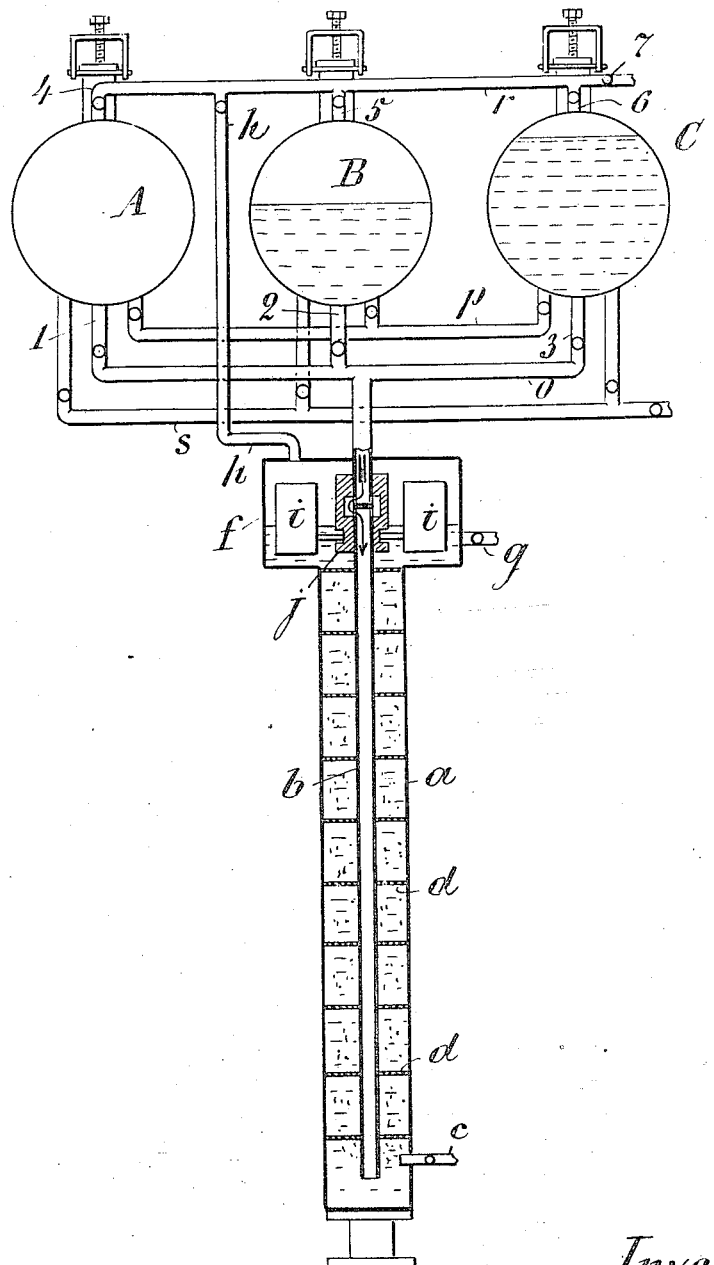

ANDERS ANDERSEN PINDSTOFTE, OF COPENHAGEN, DENMARK.

APPARATUS FOR IMPREGNATING LIQUIDS WITH CARBONIC ACID.

1,064,535. Specification of Letters Patent. Patented June 10, 1913.

Application filed October 14, 1911. Serial No. 654,756.

*To all whom it may concern:*

Be it known that I, ANDERS ANDERSEN PINDSTOFTE, manufacturer, subject of the Kingdom of Denmark, residing at No. 62 Frederiksberg Allée, in the city of Copenhagen, Denmark, have invented new and useful Improvements in Apparatus for Impregnating Liquids with Carbonic Acid, of which the following is a specification.

My invention relates to an improved apparatus for impregnating liquids with carbonic acid and it consists in the constructions, combinations and arrangements herein described and claimed.

My invention provides an improved apparatus by which an excess of carbonic acid is passed upwardly through a compact ascending column of liquid, for thoroughly expelling and removing the air from the latter in order to permit the liquid to be fully saturated with carbonic acid.

My improved apparatus enables liquids to be fully saturated with carbonic acid at comparatively high temperatures, and eliminates the expense of cooling the liquids before treatment. Further, I am enabled to fully saturate liquids with carbonic acid at relatively low pressures, thereby avoiding danger of troublesome and expensive bottle breakage and loss.

The accompanying drawing, forming a part of this application, illustrates one embodiment of my invention in which a narrow and relatively high impregnating chamber $a$ is provided with a supply-pipe $b$ for the liquid under treatment; said supply pipe extending from the top of the chamber $a$ to near its bottom. A supply pipe $c$ for carbonic acid provided with a valve leads into the chamber a little above the lower end of the pipe $b$. The chamber $a$ is provided with perforated partitions $d$ arranged at suitable distances apart. The upper part $f$ of the impregnating chamber $a$ is enlarged and provided with a bottling pipe $g$ and an air outlet pipe $h$. As illustrated the pipe $b$ may be provided with a valve $j$ controlled by a float $i$, which valve when the level of the liquid rises to a certain height automatically cuts off the supply of liquid to the impregnating chamber.

Above the apparatus is arranged a liquid reservoir or a number (for example three) of such reservoirs A, B and C, the lower parts of which are connected through pipes 1, 2 and 3, provided with valves to a pipe $o$, which in turn is connected to the liquid supply pipe $b$, so that, if more than a single reservoir is provided, the impregnating chamber $a$ can alternately be supplied from one or another of said reservoirs. The reservoirs A, B and C are connected to each other by a pipe $p$ provided with a valve for each of the reservoirs.

Liquids are supplied to the reservoirs through a pipe $s$ (provided with a valve for each of the reservoirs) connected to a pump or a reservoir for water under pressure. The air outlet pipe $h$ of the apparatus is connected to a pipe $r$, which through branches 4, 5 and 6, provided with valves, is connected to the upper part of the reservoirs, A, B and C, so that the quantity of carbonic acid necessary for the filling of the space in said reservoirs from which the liquid is taken can be supplied to the reservoirs through said pipes but only after having passed through the liquid in the impregnating chamber $a$.

The operation of the apparatus is as follows:—The liquid is supplied through the pipe $b$ and rises through the impregnating chamber $a$ together with the carbonic acid supplied through the pipe $c$. During its passage through the small holes in the partitions $d$ the carbonic acid becomes thoroughly mixed with the liquid by which it is absorbed in the highest possible degree expelling the air contained in the liquid. The liquid is supplied alternately to the impregnating chamber from one or another of the reservoirs A, B and C. The liquid impregnated in the chamber $a$ is bottled through the pipe $g$, while the air expelled from the liquid by the excess of carbonic acid is conducted through the pipes $h$ and $r$ to the space above the liquid in the reservoir in action; the quantity of carbonic acid necessary for the filling of the space left by the liquid in said reservoir is thus caused to pass through the impregnating chamber and the liquid supplied to it, during which passage the manifold smaller specific gravity of the carbonic acid relatively to the liquid will cause the carbonic acid to rise through the liquid with an excessively great speed, thereby putting the liquid in a violent whirling motion during which the air contained in the liquid is released and carried away with the carbonic acid.

I claim:—

In an apparatus for impregnating liquids with carbonic acid, the combination of a closed impregnating chamber, a number of partitions provided with small holes and arranged above one another in said impregnating chamber, a supply pipe for carbonic acid inserted near the bottom of said chamber, and an air outlet pipe leading from the top of said chamber, with a supply pipe for the liquid to be impregnated, which supply pipe extends from the top of the chamber to near its bottom, a bottling pipe leading from the top of the chamber, and a liquid reservoir arranged above said chamber and having its upper part connected to the air outlet pipe and its bottom connected to the liquid supply pipe; substantially as described and illustrated and for the purpose specified.

In testimony whereof I have signed my name to this specification in the presence of two subscribing witnesses.

ANDERS ANDERSEN PINDSTOFTE.

Witnesses:
   OLAF SCHRÖDER,
   CONSTANTIN EBERTS.